United States Patent [19]

Wood et al.

[11] Patent Number: 4,631,708
[45] Date of Patent: Dec. 23, 1986

[54] TRANSMITTER/RESPONDER SYSTEMS

[75] Inventors: David H. Wood, Stoke Poges; Martin Creswick, Flackwell Heath, both of England

[73] Assignee: Senelco Limited, United Kingdom

[21] Appl. No.: 830,913

[22] Filed: Feb. 18, 1986

Related U.S. Application Data

[63] Continuation of Ser. No. 450,152, Dec. 15, 1982.

[30] Foreign Application Priority Data

Dec. 18, 1981 [GB] United Kingdom ............ 8138270

[51] Int. Cl.⁴ .................. H04B 1/59; G01S 9/56; G01S 13/74; H04Q 5/22
[52] U.S. Cl. ........................... 367/2; 340/825.54; 342/195; 342/42
[58] Field of Search ............. 178/22.13, 22.14, 22.15, 178/22.16, 22.17; 343/6.5 R, 6.5 LC, 6.8 LC, 6.8 R, 6.5 SS; 367/2, 3, 4, 5, 6, 87, 93, 95, 97; 340/825.72, 825.73, 505, 539, 696, 825.54

[56] References Cited

U.S. PATENT DOCUMENTS

| | | | |
|---|---|---|---|
| 2,883,660 | 4/1959 | Arenberg | 343/17.7 |
| 3,460,060 | 8/1969 | Abruzzo et al. | 343/6.5 LC |
| 3,689,885 | 9/1972 | Kaplan et al. | 343/6.8 LC X |
| 3,898,619 | 8/1975 | Carsten et al. | 340/152 |
| 3,922,636 | 11/1975 | Narbaits-Jaureguy | 343/6.5 LC X |
| 3,945,006 | 3/1976 | Cleeton | 343/6.5 R |
| 3,962,657 | 6/1976 | Redman et al. | 343/17.7 X |
| 3,981,011 | 9/1976 | Bell, III | 343/6.5 LC |
| 4,005,418 | 1/1977 | Gorwara | 343/6.8 LC X |
| 4,063,173 | 12/1977 | Nelson | 343/6.8 R |

FOREIGN PATENT DOCUMENTS

| | | |
|---|---|---|
| 505686 | 11/1979 | Australia . |
| 0006691 | 9/1980 | European Pat. Off. . |
| 253560 | 4/1967 | Fed. Rep. of Germany . |
| 1946247 | 3/1973 | Fed. Rep. of Germany . |
| 2535410 | 8/1974 | Fed. Rep. of Germany . |
| 2453647 | 11/1974 | Fed. Rep. of Germany . |
| 2642022 | 4/1977 | Fed. Rep. of Germany . |
| 1187130 | 4/1970 | United Kingdom . |
| 1337189 | 11/1973 | United Kingdom . |
| 1505093 | 3/1978 | United Kingdom . |
| 1507050 | 4/1978 | United Kingdom . |

*Primary Examiner*—Charles T. Jordan
*Assistant Examiner*—Brian S. Steinberger
*Attorney, Agent, or Firm*—M. LuKacher

[57] ABSTRACT

A memory suitable for use as a responder, comprising:
(a) receiver means for receiving a transmitted signal S1;
(b) generator means (76) for generating a carrier component of a transmittable signal S2;
(c) logic means (L2) for enabling signal S2 to be in mathematical relationship with signal S1, said logic means comprising:
  (i) at least one memory means (60) for storing code;
  (ii) at least one modulation means (65) for modulating said carrier component of signal S2, the modulating being under control of at least a portion of said stored code, such that signal S2 is in coded mathematical relationship with signal S1; and
(d) transmitter means (T2) for transmitting signal S2.

16 Claims, 2 Drawing Figures

TRANSMITTER/RESPONDER SYSTEMS

This is a continuation of application Ser. No. 450,152, filed 12/15/82, now abandoned.

It is known that a signal transmitted from first apparatus can cause second apparatus to transmit a signal receivable by said first apparatus, so as to enable said first apparatus to detect the presence of said second apparatus.

In the following description, reference is made to signals. Any such signal can be embodied in any suitable manner(s). Any such signal can travel or be conveyed in any suitable manner(s). Physical conveyor means (e.g. a transmission line or waveguide) can be used. But, it is not necessary to provide physical conveyor means when a signal is a wave that can travel through optional space separating receiver means from a source of that wave, e.g. when a signal is an electromagnetic wave of radio frequency.

A first aspect of the present invention provides a responder, comprising:
(a) receiver means for receiving a transmitted signal S1 comprising a frequency f1;
(b) generator means for generating a carrier frequency f2 of a carrier component of a transmittable signal S2 comprising carrier frequency f2 and code;
(c) logic means for enabling signal S2 to be in mathematical relationship with signal S1, said logic means comprising:
  (i) at least one memory means, adapted to be programmed for storing code, or storing said code,
  (ii) at least one modulation means for modulating said carrier component of signal S2, the modulation being under control of at least a portion of said stored code, such that signal S2 will be in coded mathematical relationship with signal S1,
  (iii) at least one clock means for providing at least one clocking signal for enabling or disenabling access of at least a portion of said stored code to said at least one modulation means;
and wherein said at least one memory means is adapted to be programmed or reprogrammed with said code by receiving at least one programming signal to be provided by nonphysical linkage between said responder and at least one source of said at least one programming signal, said at least one programming signal comprising code to be routed to said at least one memory means so as to provide said stored code.

The term "responder" does not imply any restriction to any particular application, other than that the responder must be embodied in a manner suitable for any particular application to which the responder is to be put. Said responder can be utilized in any suitable application(s) for at least one purpose. One example of a purpose is for a receiver/transmitter for identifying the presence of said responder. Another example of a purpose is when said responder is a temporary store or register of information. A further purpose is when said responder is a transducer.

A second aspect of the present invention provides apparatus comprising: at least one responder according to said first aspect of the invention; and transmitter means for transmitting at least one signal S1 to at least one said responder.

A third aspect of the present invention provides an identification or security system, comprising: at least one responder according to said first aspect of the invention; or at least one apparatus according to said second aspect of the invention.

Any feature of the first and second aspects of the present invention can comprise at least one discrete component and/or at least one integrated circuit, e.g. for processing at least a portion of data for and/or provided by at least one of those features. For example, said responder can comprise a single integrated circuit that can process at least a portion of data for and/or provided by said features. CMOS integrated circuitry is convenient for a battery energised responder. Said responder can comprise at least one microprocessor for processing at least a portion of data for and/or provided by at least one of said features. For many applications, it is preferred that a said responder comprises a said single integrated circuit.

Said receiver means (a) can be adapted to respond to a signal S1 containing at least one predetermined portion of the electromagnetic spectrum of frequencies. Signal S1 can comprise a carrier continuous electromagnetic wave, e.g. such a wave that has a radio frequency or is laser generated. Alternatively, signal S1 can comprise an ultrasonic wave. In general, signal S1 can be embodied in any suitable manner(s). Preferably, signal S1 contains code to which said at least one memory means can respond.

At least a portion of code from a coded signal S1, or from another source, can be utilized for providing said at least one memory means with storable code, and/or for modifying at least a portion of code when already stored by said at least one memory means, and/or for replacing at least a portion of said stored code. Said at least one memory means can be adapted to retain stored code (unless said stored code is deliberately purged from said at least one memory means) for at least the usable life of a limited life source of energy for energising said responder, e.g. a battery, capacitor, or supplies to a fuel cell. Said at least one memory means can be adapted to warn when at least a predetermined portion of any said life has expired.

In general, transmitted coded signal(s) S1 can serve various purposes, e.g. as mentioned above. Transmitted code signal(s) S1 can be used for programming said at least one memory means with at least a portion of initial said stored code. In general, any signal received by said at least one memory means so as to provide said at least one memory means with stored code is a programming signal. Transmitted coded signal(s) S1 can be used in interrogating a responder, or in enabling a responder to interrogate apparatus providing transmitted coded signal(s) S1. For example, that interrogation can enable said at least one modulation means to enable, disenable, or change modulation of signal S2, depending on the reaction of said logic means. Thus, a responder can be interrogatable and/or be an interrogator.

Said generator means can be embodied in any suitable manner(s), e.g. comprise a programmable divider.

Said at least one memory means can be adapted to receive at least one initial programming signal providing at least a portion of said stored code. Such a signal can come from at least one source not part of said responder, and/or from at least one source that is part of said responder. For example, first transmitter means for transmitting coded signal(s) S1 can provide initial said stored code; and second transmitter means (e.g. part of a base station or other suitable sensor apparatus of signal S2) can provide coded signal(s) S1 after said initial stored code has entered said at least one memory means.

Said first transmitter means can be programmer apparatus. Preprogramming or reprogramming of a responder can be carried out at e.g. a factory or service facility, or at a location of use of the responder, by utilising e.g. suitable coded signal(s) S1.

Said at least one memory means can comprise a plurality of memory sections each addressable by a respective one of a plurality of address lines to said generator means. Said plurality can be an even or odd number, e.g. 3. It will be appreciated that said generator means is reprogrammable depending on the effect(s) of said at least one modulation means.

Said logic means can be adapted for enabling or disenabling access of any said programming signal to said at least one memory means. Said logic means can be adapted for enabling or disenabling access of at least a portion of said stored code to signal S2.

Said logic means can comprise various control means, e.g. program delay means, counter means (e.g. at least one binary counter), gate means, and clock means.

Said logic means can comprise clock means for clocking said at least one memory means such that items of data provided as input to said at least one memory means are routed to respective ones of input section(s) of said at least one memory means. Said clock means can provide signal S3 as a signal for providing said clocking. That provision can be responsive to optional signal S4, e.g. S3 can correspond to or be modulation of a modulated signal S4. A source of signal S3 can be part of or not part of said responder. Frequency of any said carrier component of an electromagnetic wave S1 can be greater than the maximum frequency of said clocking of said at least one memory means. Gating to enable or disenable clocking can be provided in any suitable manner(s), e.g. by gate circuitry comprising at least one AND gate. Signal S4 can be generated in or otherwise provided to said responder, e.g. as an optional input to said responder. Transmitter means can transmit signal S4. Signal S4 can be a modulated signal.

Logic means can comprise suitable gate circuitry for any said purpose of said logic means. Said gate circuitry is preferably adapted to be partly controllable by at least a plurality of signals derived in said responder from signal S1, wherein:

(a) a first derived signal from coded signal S1 is a derived frequency derivative of a carrier frequency of that signal S1; and
(b) a second derived signal from that coded signal S1 is demodulation from that signal.

Said gate circuitry can be adapted to be partly controllable by at least a portion of signal S3 receivable optionally by said gate circuitry. For example, said gate circuitry can have 3 inputs, each respectively for said first and second derived signals and for signal S3; and an output for addressing said at least one memory means. Said gate circuitry can enable said access to said at least one memory means, such that said second derived signal provides data input to said at least one memory means; and signal S3 provides clock pulses to said at least one memory means so as to enable or disenable entry of that data into said at least one memory means. Signal S2 can be higher in frequency than signal S3, or have any other suitable relationship with signal S3.

Said mathematical relationship can comprise at least one variable. For example, when each of signals S1, S2 has a respective carrier component (e.g. frequency of a respective carrier continuous electromagnetic wave) and a respective code component (e.g. modulation of said wave), signal S2 can be varied by changing the frequency component and/or code component of signal S1. Preferably, change in the code component of signal S1 produces changes in the carrier component of signal S2 (e.g. change in frequency of a carrier continuous electromagnetic wave). In one example, signal S1 has a carrier frequency f1 modulated by code, signal S2 has a carrier frequency f2 modulated by code (preferably the same code as that of S1), and frequencies f1, f2 are preferably characterized by:

$$f2/f1 = n$$

in which n is any whole or fractional number other than zero, n being greater or less than zero, e.g. substantially 2. Preferably, said carrier frequencies are frequencies of suitable electromagnetic waves. Said codes can be any suitable codes, and be the same or different. Preferably, a said code contains data in a predetermined arithmetic, e.g. a binary arithmetic, for instance simple binary code, or ASCII code (i.e. American Standard Code for Information Interchange), or BCD code (i.e. Binary Coded Decimal arithmetic). It will be appreciated that said modulation can be provided in any suitable manner(s) dependent on the nature of the codes. Preferably, said modulation comprises any suitable pulse modulation. Pulse modulation can conform with any suitable waveforms required for signals S1, S2. Examples of pulse modulated signals S1, S2 are digitally modulated carrier continuous electromagnetic waves in the bandwidth 120 to 144 Kilo Herz. Any suitable bandwidths can be utilised and will depend on local licensing authorities.

Said transmitter means (d) of said responder can be adapted to transmit a signal S2 containing at least one predetermined portion of the electromagnetic spectrum of frequencies. Signal S2 can comprise a continuous carrier electromagnetic wave (see above), e.g. such a wave that has a radio frequency or is laser generated. Signal S2 can comprise an ultrasonic wave. In general, signal S2 can be embodied in any suitable manner(s).

Signals S1, S2 can be transmitted for any respective period(s) of time. Preferably, generation and/or transmission of signal S2 is in time phase with reception of signal S1. However, it is possible to provide signal S2 with at least one delay.

Said responder or said apparatus can comprise any suitable transducer means for receiving signal S1 or transmitting signal S2. Transducer means are well known for dealing with reception or propagation of electromagnetic waves, or reception or propagation of sonic waves (e.g. piezoelectric transducers). Said responder or said apparatus can comprise at least one radiator (for instance an aerial) for receiving and/or transmitting any of signals S1, S2, S4 appropriately. A said aerial or a plurality of aerials (e.g. an array) can be fixed or tunable with respect of aerial characteristics (such tuning can be controlled in any suitable manner(s), e.g. by utilising said logic means). As an example, there can be a respective radiator for each signal S1, S2, S4, for instance respective wire coils (on ferrite cores) for signals S1, S2, and a printed loop for signal S4.

Said responder's receiver means and transmitter means can comprise respective tuned circuit(s). Said tuned circuits can be controlled in any suitable manner(s), e.g. by utilising said logic means.

Said responder can comprise display means for providing at least one display corresponding to at least a portion of at least one said signal. Said display means can be controlled in any suitable manner(s), e.g. by utilising said logic means.

Said responder can comprise means for changing at least one of the following parameters of said responder; receiver characteristic(s); reception time(s); transmission time(s); transmitter characteristic(s). Said changer means can be controlled in any suitable manner(s), e.g. by utilising said logic means.

Said responder can be utilised e.g. in an identification system or security system, e.g. for access control, stock control, identification of individuals (e.g. human, animal, or object—for instance a land, sea, or air vehicle). Said responder can have a capacitor for storing at least one code at the same or different times. Said stored code enables signal S2 to be a unique characterisation or unique identification of said responder, but that characterisation or identification can be changed by changing said stored code.

Said signal S2 can be sensed by at least one sensor means. Said sensor means can be embodied in any suitable manner(s), e.g. as discrete apparatus or as component(s) of apparatus. It will be appreciated that at least one responder and at least one sensor means can be part of e.g. an identity or security system, e.g. a plurality of sensor means can be spaced apart so as to respond (i.e. be latched to) at least one said responder. Said sensor means can be adapted to process data. Said sensor means can comprise and/or be adapted to interface with a computer system (see later below).

For apparatus of said second aspect of the invention, transmitter means can be embodied in any suitable manner(s). At least one said responder and at least one said transmitter means can be movable relative to each other. At least one transmitter means can be a programmer for initially programming and/or reprogramming said at least one memory means. At least one transmitter means can be a base station for initially programming and/or reprogramming said at least one memory means and/or providing interrogation signals S1.

Sensor means for sensing at least one signal S2 from at least one said responder can be embodied in any suitable manner(s). At least one said responder and at least one said sensor means can be movable relative to each other. At least one sensor means can comprise a programmer for initially programming and/or reprogramming said at least one memory means. At least one sensor means can comprise a said base station.

Said base station can interrogate at least one said responder for any desired period(s) of time. Interrogation of a plurality of responders can be at different or same times. Said base station can be adapted to change interrogation period(s) or receiver characteristic(s) of said base station and/or of responder at different locations. Such a change can be in response to at least one signal S2.

At least one said sensor means can comprise and/or interface with other apparatus, e.g. comprise and/or interface with a computer system, for instance a microprocessor or main frame computer. Such a computer system can comprise e.g. encoder means for generating at least a portion of at least one said code. Said computer system can comprise e.g. decoder means for decoding at least a portion of at least one said code.

In one example, a coded responder is attached to an object; sensor(s) up to e.g. 3 meters away from the responder detect the coded responder; and detected information sensed by the sensor(s) is passed to a microprocessor controller which identifies code and produces relevant output, e.g. to initiate further action.

The following are some examples of some advantages of the present invention:

1. A responder has a receiver to detect a carrier frequency f1. The responder transmits a carrier frequency f2 that is in mathematical relationship with carrier frequency f1 and modulated by coded information stored in an integrated circuit forming part of this example of the responder.
2. Carrier frequency f2 can be predetermined by programming the memory of a responder, the programming being binary coded information that enables or changes the mathematical relationship of carrier frequency f2 to carrier frequency f1.
3. Coded signal S2 can be adapted to contain information for affecting at least one mode of operation of at least one sensor means responsive to the responder.
4. Coded signal S2 can be sensed so as to detect the mathematical relationship, and enable action to be taken or not taken upon the result of that sensing, e.g. by displaying information or passing information to e.g. a microprocessor for further processing.
5. A responder can be programmed without physical connection to a programmer, and retain programmed data for the life of a battery for energising the responder.
6. Data retained by a responder can be changed by reprogramming the responder.
7. Data retained by a responder can be in simple binary arithmetic, ASCII arithmetic, or BCD arithmetic.
8. Said sensor means can change the receiver characteristics or interrogation length of responders so as to examine a plurality of responders in the same detection region.
9. A responder can allow for sampling of fewer data bits in a sensed bit code, so as to decrease interrogation time of the responder.
10. When individual ones of a plurality of responders transmit their signals S2 at any time, suitable said sensor means can "see" a composite signal S2 comprising those transmitted signals, and be adapted to identify the composite signal as an indication of the presence of each of those responders. Said sensor means can be adapted to process said composite signal so as to identify components respectively corresponding to individual ones of said plurality of responders. This identification can use any suitable mathematical techniques, e.g. by referring to code structure(s) of individual responders, for instance when said sensor means is programmed with those code structure(s). Said sensor means can comprise and/or interface with a computer system (e.g. a microprocessor) that can be used to identify those components.
11. Said sensor means can decode code from a data stream obtained from at least one signal S2, e.g. from a said composite signal S2. composite signal S2. Decoding can be provided of e.g. optional encryption of scrambled information that might have been programmed into at least one said responder.
12. Redundant data bits from a data stream obtained from signal S2 can be used e.g. to provide automatic data correction at said sensor means before said sensor means takes further action.
13. Responders can be manufactured from identical components but be programmed differently to enable different tasks to be performed by separate responders.

14. A responder's logic circuitry can comprise a programming clock receiver for signal S4 such that by increasing the sensitivity of that receiver the responder can be programmed at a distance from e.g. a base station or other separate controller.

15. A modulated carrier electromagnetic wave of radio frequency can be demodulated by providing the responder with a passive network at the front end of the responder's receiver means such that the transmitted carrier of signal S1 can be of a higher frequency than the maximum clock rate of the responder's logic circuitry.

16. Responders emitting signals S2 that are not compatible with required interrogation can be rejected, thereby providing unique integrity and security.

17. A responder's programming clock output can be gated with respect to the clock input of the responder's memory. Gate circuitry can have an input controlled by delay from at least one binary counter.

18. The memory of a responder can receive data when gate circuitry enables a programming clock signal to be applied to the memory.

19. Available data bits in a code can be used to control output frequency of signal S2 and corresponding automatic aerial tuning.

20. Available data bits in a code can be used to control current consuming devices (e.g. resistors) so as to enable a preset power unit life for said responder.

21. Available data bits in a code can be used to indicate the state of a source of power to said responder.

22. A plurality of responders, or separate ones thereof, can be identified at any one time up to the total number of data bits in use in a particular system of code used.

23. A plurality of data bits of a code can be used to identify selected pluralities of responders, e.g. so as to indicate or identify individual pluralities of responders.

It will be appreciated that said signal S2 can be adapted to contain information for affecting at least one mode of operation of at least one sensor means responsive to said responder.

A base station (or programmer) can have at least one mode of operation responsive to at least one signal S2, different signals S2 being able to produce e.g. a change in mode of operation of said base station, for instance to reject a code contained by a signal S2, and/or modify a code in a signal S1 so as to reprogram at least one responder with another code. Said base station (or programmer) can comprise changer means for changing at least one of the following parameters of said base station (or programmer) in response to at least one signal S2, or other instruction: receiver characteristic(s); reception time(s); transmission time(s); transmitter characteristic(s). That changer means can be controlled in any suitable manner(s), e.g. by said logic means. Said base station (or programmer) and at least one said responder can be inter-related by means of signals S1, S2 and said codes so as to enable a dialogue to be carried out between said base station (or programmer) and at least one said responder. For example, said base station (or programmer) and a plurality of said responders can be adapted such that said base station (or programmer) can identify at least one plurality of said responders and/or at least one individual responder of at least one plurality of said responders.

Said base station (or programmer) can transmit signal S1 for any period of time, thereby enabling said base station (or programmer) to interrogate at least one said responder for any desired period of time.

In the accompanying drawings, which are given by way of example:

Figure 1:
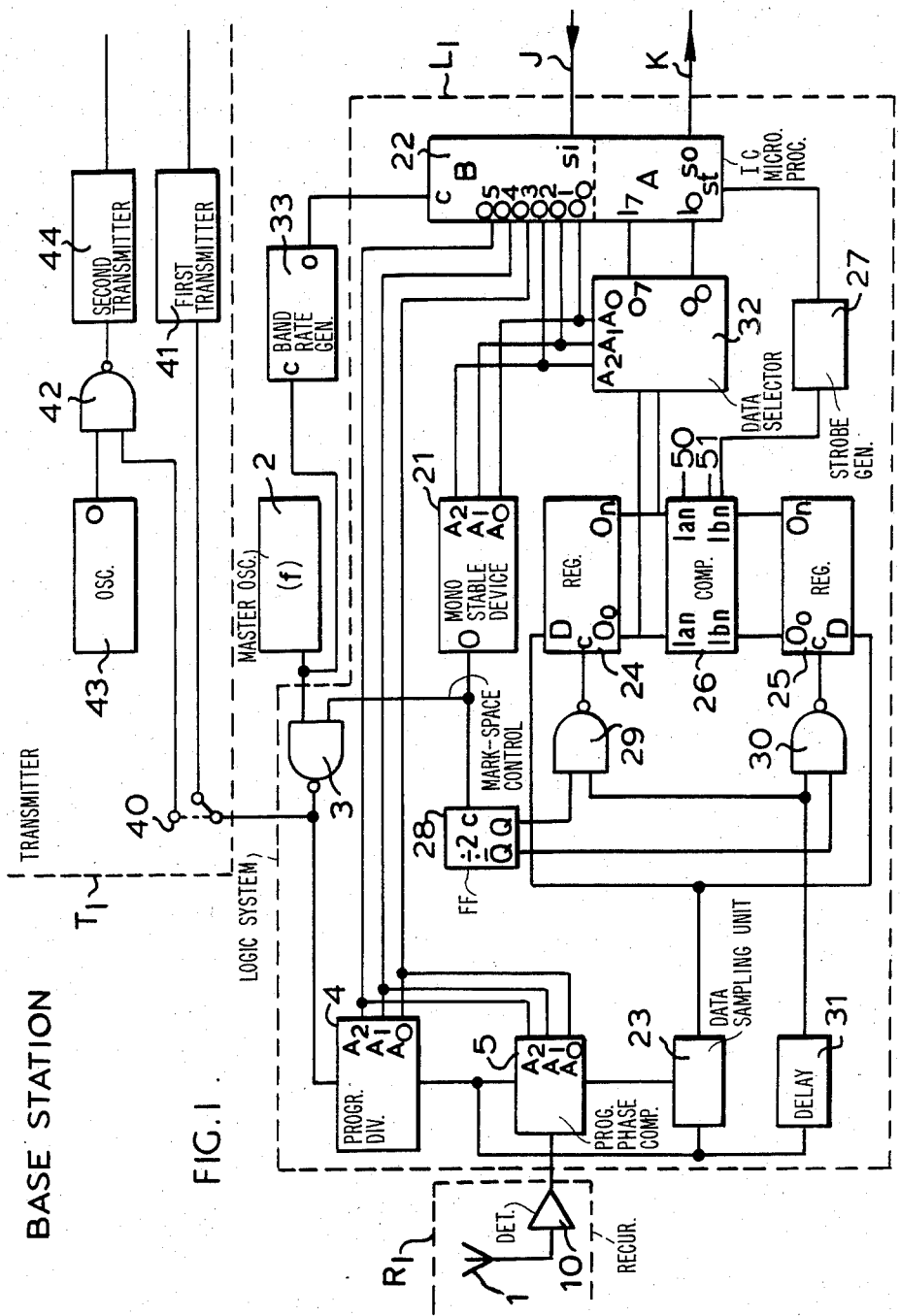
FIG. 1 shows schematic circuitry for one embodiment of a base station according to the present invention.
Figure 2:
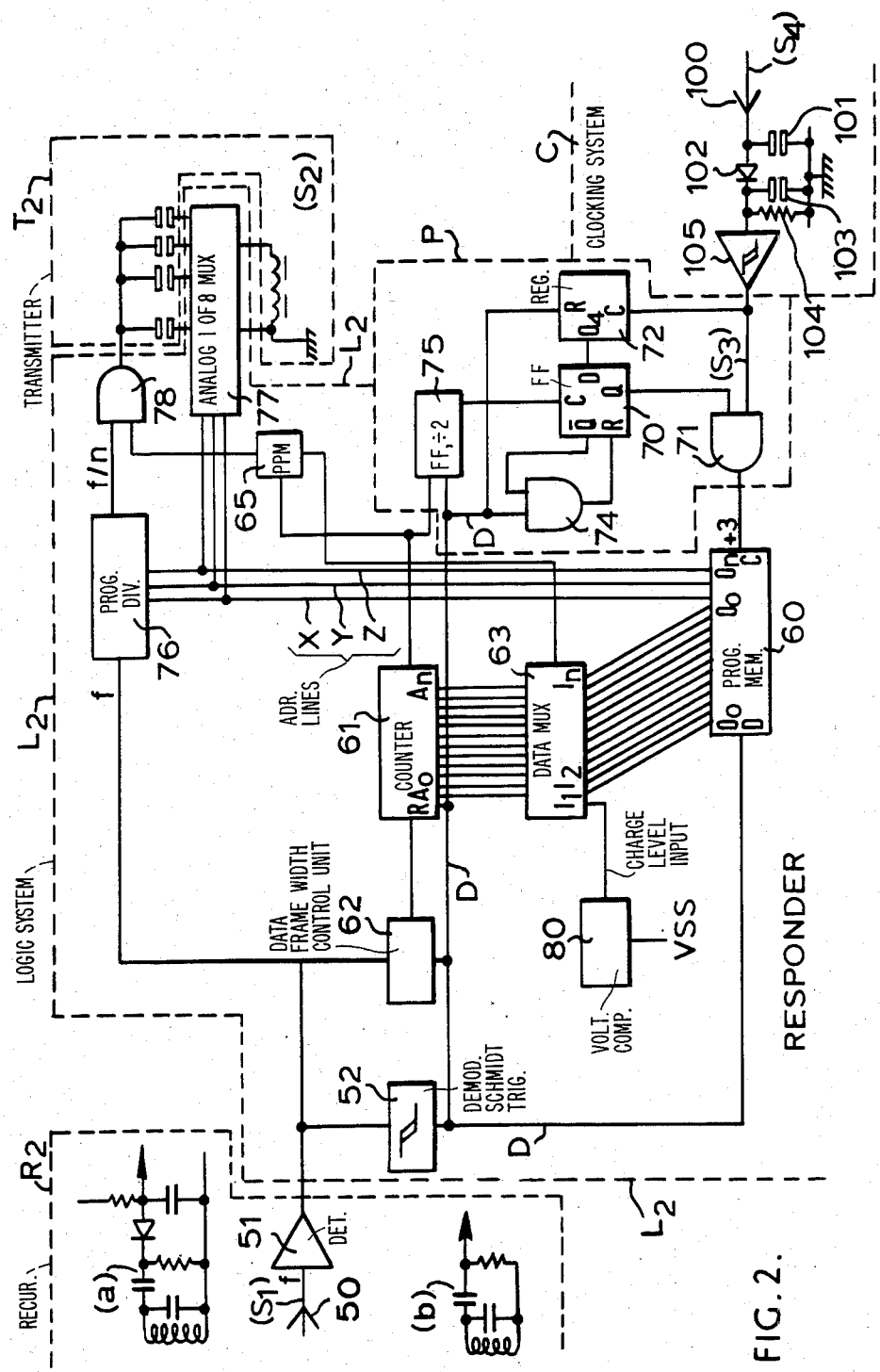
FIG. 2 shows schematic circuitry for one embodiment of a responder according to the present invention.

The circuits of FIGS. 1 and 2 are adapted to operate in accordance with the above-mentioned preferred mathematical relationship $f1/f2 = n$.

In FIG. 1, the base station is a transmitter/receiver apparatus having a master oscillator 2 (e.g. a crystal controlled oscillator) resonating at a master frequency $f$ that controls carrier continuous electromagnetic wave frequency transmitted by a transmitter system shown in box $T_1$. The frequency $f$ can have any value, subject to the frequency of the maximum clock rate of the responder (FIG. 2), and subject to any frequency restriction prescribed by a licensing authority. The frequency $f$ passes from master oscillator 2 to one input of NAND gate 3. The other input of gate 3 is connected to programmable, mark-space, monostable device 21 (see later below) in a logic system $L_1$. Device 21 is programmable by data selector 32 so as to control the period(s) of time signals are switched on (i.e. mark) to the period(s) of time signals are switched off (i.e. space), for signals to NAND gate 3 and flip flop 28 (see later below). Device 21 can have any suitable oscillator means and gate means for providing that switching. The output of gate 3 passes the frequency $f$ to transmitter system $T_1$ and to programmable divider 4. An integrated circuit 22 within logic system $L_1$ sets both divider 4 and a programme phase comparator 5 connected to the output of divider 4 (which provides reference timing data), so that the operating and capture ranges of comparator 5 are in accordance with the receiver system comprising detector 10 shown in box $R_1$ and the bandwidth of aerial 1 of receiver system $R_1$, such that only signals from the responder (FIG. 2) compatible both in frequency and phase will be processed by base station. Data in the form of pulse position modulation (i.e. PPM) generated by comparator 5 from signals from detector 10 and divider 4 are fed from comparator 5 into a data sampling unit 23 in logic system $L_1$ together with timing data from divider 4, and checked in sampling unit 23 for data content and errors in data frames before being passed to temporary holding registers 24, 25 in logic system $L_1$. Each register 24 or 25 is a serial to parallel converter, whose register capacity is equal to the maximum code length to be stored by that register. The outputs of registers 24, 25 are fed to a magnitude comparator 26. The comparator 26 determines whether or not the totals in registers 24, 25 are greater than, less than, or equal to one another. If the total entered in register 24 equals that in register 25, then a data available flag can be set to provide a strobe pulse generated in monostable strobe generator 27, or utilised in any other way, e.g. request for interrupt processing of a multiprocessor (not shown). The strobe pulse is addressed to section A of integrated circuit 22 so as to indicate that data on lines $I_0$ to $I_7$ (only lines $I_0$ and $I_7$ are shown) are valid during the duration of the strobe pulse.

Transmitter $T_1$ includes switch 40 for enabling master frequency $f$ from gate 3 to go either to a first transmitter 41 or to one input of NAND gate 42. The second input of gate 42 is connected to an oscillator 43 having a higher resonance frequency than frequency f. Gate 42 enables a second transmitter 44 to transmit or not transmit frequency from oscillator 43.

The length of code received by receiver system $R_1$ is controlled by a signal from the programmable, mark-space, monostable device 21 present in logic system $L_1$. The device 21 determines the period of transmission time from transmitter system $T_1$. The device 21 enables access time for interrogation of the responder (FIG. 2) to be tailored to meet the degree of acceptance in the environment of the responder, e.g. the number of data bits desired times frame width equals access time required, e.g. $48 \times 4$ ms = 192 ms. Transmission from the base station can be switched off for e.g. a minimum of 10 ms to permit the responder (FIG. 2) to reset counts etc. An output from the device 21 is coupled to an input of gate 3, and enables an input of flip flop unit 28 whose two outputs Q, $\overline{Q}$ pass via first inputs of the respective NAND gates 29, 30 to registers 24, 25. Flip flop 28 requires two successive pulse inputs for providing one pulse output. The second inputs of gates 29, 30 are coupled together and connected to a monostable delay unit 31, which is connected to a line coupling programmable divider 4 and phase comparator 5, and also connected to sampling unit 23. The delay unit 31 enables input data to registers 24, 25 to settle before entering those registers.

Operation of decoding provided by the base station can be expanded to sample groups of data via data selector 32 in logic system $L_1$, and to decypher encrypted code. Thus, the decoding can expand the number of possible codes attainable by e.g. simple binary arithmetic.

Integrated circuit 22 interfaces between circuitry shown in FIG. 1 and other circuitry (not shown). Line J provides serial input addressed to section B of circuit 22. Line K provides serial output from circuit 22. Integrated circuit 22 provides a clock signal to Baud rate generator 33 that provides another clock signal. The generator 33 is coupled to a line connecting oscillator 2 to gate 3. The integrated circuit 22 has two sections, Section A, Section B. The Section A of circuit 22 is coupled to eight output stages (shown as $O_0$ to $O_7$) of data selector 32. Section B of circuit 22 has three outputs (shown as $O_0$ to $O_2$) coupled to three inputs (shown as $A_0$ to $A_2$) of data selector 32; the three outputs are also coupled to corresponding inputs of device 21. Three further outputs (shown as $O_3$ to $O_5$) of the circuit 22 are coupled to lines each respectively connected to inputs of divider 4 and comparator 5.

In FIG. 2, the responder is a receiver/transmitter having a receiver system shown in box $R_2$ and a transmitter system shown in box $T_2$. Receiver system $R_2$ contains a detector 51 for detecting carrier wave frequency f in the transmission from the base station. Receiver system $R_2$ contains alternative optional tuned circuits (a), (b) which can be energised by aerial 50 so as to provide signals for use in receiver system $R_2$.

A demodulator 52 (which can include a Schmidt trigger circuit for providing acceptable logic levels of a demodulated signal) responds to a signal of sufficient amplitude from detector 51, so that demodulator 52 feeds an output signal into a release or reset line D leading e.g. to programmable memory 60 in a logic system shown in the box $L_2$. The release line D can enable a signal from demodulator 52 to release (i.e. unlock) a counter 61, such that the carrier frequency f will enable the released counter 61 to count as long as that frequency is present. The portion of release line D which couples demodulator 52 and counter 61 is also connected to an input of data frame width control line 62. The control unit 62 sets the nominal frame width (i.e. the duration of two successive data bits) of the data to be processed by the logic system $L_2$. After a delay preset in control unit 62, an output of control unit 62 is fed to counter 61. Counter 61 has a plurality of outputs coupled to inputs of data multiplexer 63 so as to address binary encoded signals to those inputs. As counter 61 counts, the multiplexer 63 samples bits stored in programmable memory 60. Outputs from counter 61 and from multiplexer 63 are fed into the input of pulse position modulator 65, whose output is to modulate the transmitter system $T_2$.

A programming control system shown as a subdivided box P of logic system $L_2$ is used to enable or disenable entry of data from release line 4 into reprogrammable memory 60. A programme enable flip flop 70 has an output Q coupled to an input of AND gate 71, whose other input is coupled both to a clocking system shown in box C which is part of the logic system $L_2$, and to a register 72 having an output coupled to input D of flip flop 70. Clock signals S3 from the clocking system C cannot reach the corresponding input of memory 60 when the gate 71 is in a blocking mode. Clocking system C can receive a signal S4 via an aerial or other means, so as to enable signal S3 to be provided. The Q output of flip flop 70 can only be changed by preloading a count into register 72 from the clocking system C, and providing carrier frequency f is present to release line D. When line D is released by carrier frequency f, and after sufficient time has passed to enable flip flop 70 to be clocked via register 72, the clock system C is modulated so that the output of register 72 is changed to enable change in input D of flip flop 70. When carrier frequency f has enabled sufficient clocking of flip flop 70, the outputs Q, $\overline{Q}$ of flip flop 70 are inverted, the Q output then enabling the clocking system C via AND gate 71 to communicate with memory 60, and the $\overline{Q}$ output causing AND gate 74 to pevent release line D from affecting flip flop 70 via gate 74 coupled to flip flop 70's input R. The mode of flip flop 70 remains unchanged until the next clocking period regardless of the state of line D.

Counter 61 provides a clock signal to a line interconnecting pulse position modulator 65 and a divide by two flip flop 75 (which delays clock output from the counter 61). An output of flip flop 75 is coupled to an input of the flip flop 70. The programming clocking system C cannot reach memory 60 during the blocking mode of AND gate 71, whose other input is controlled by the Q output of flip flop 70. When the clocking system C can affect memory 60, data will be shifted in serial form into the memory 60 from line D.

Memory 60 has three address lines XYZ for enabling a maximum of eight signals to address programmable divider 76 for it to divide the carrier frequency by a said number n. Divider 76 has an input coupled to a line connected to output of detector 51, and is also coupled to an input of width control unit 62. The XYZ lines are also coupled to an "analogue one of eight" multiplexer 77, so that at least one input of a possible eight inputs can be passed at any one time by multiplexer 77 to transmitter $T_2$. The data lines X, Y, Z can enable output frequency and tuning of transmitter $T_2$ to be determined. Output of divider 76 and output of modulator 65 are coupled to inputs of AND gate 78, whose output is coupled to transmitter T₂.

Irrespective of the code length transmitted by the transmitter system T₂, the train of transmitted data can contain a start bit for synchronisation, and a bit for indicating a low level of charge of a battery supply (not shown) for operating the responder, thereby enabling precautionary action to be taken before the battery charge level has fallen to cause corruption or loss in the code. Voltage comparator 80 is coupled to an input of multiplexer 63, and can be utilised in said charge level indicating.

In FIG. 1, optional lines 50, 51 enable two outputs from magnitude comparator 26 to be utilised in any useful way. The flip flop 28 is shown with "÷2" so as to indicate that flip flop 28 changes from one mode of operation to an opposite mode of operation, in order to enable data acquisition in register 24 or in register 25.

The truth table of any said AND gate is:

| Input A | Input B | Output C |
|---------|---------|----------|
| 1       | 1       | 1        |
| 1       | 0       | 0        |
| 0       | 1       | 0        |
| 0       | 0       | 0        |

The truth table of any said NAND gate is:

| Input A | Input B | Output C |
|---------|---------|----------|
| 1       | 1       | 0        |
| 1       | 0       | 1        |
| 0       | 1       | 1        |
| 0       | 0       | 1        |

Clocking system C provides one example of a programmable enable clock responsive to an incoming signal S4 that is a continuous electromagnetic wave of radio frequency and amplitude modulated with data. Clocking system C receives signal S4 via an optional aerial 100. Clocking system C has an aerial tuning capacitor 101, a diode rectifier 102, a demodulation circuit formed by capacitor 103 and resistor 104, and a Schmitt trigger circuit 105 for providing acceptable logic levels of signal S3.

Components for circuitry according to the accompanying drawings can be constituted in any suitable manner(s). One example of an integrated circuit for use in embodying e.g. a responder can utilise integrated circuit no. OM 1830 of Mullard Limited. In general, it will be appreciated that any suitable modification(s) can be made to circuitry shown in the accompanying drawings, or described in the description given above before the first reference to the drawings. For example, any suitable logic device (for instance a different kind of logic gate) and/or any suitable logic circuitry can be utilised in providing a said modification. Furthermore, any suitable frequency(s) can be used for any carrier frequency or any intermediate frequency. A frequency can be provided with information by means of any suitable modulation(s). The present invention can be utilised in any suitable application, and in any suitable environment. For example, a responder can be attached to something or be implanted in something.

We claim:

1. A responder comprising:

(a) receiver means for receiving a transmitted signal S1 comprising a frequency f1;
   (b) generator means for generating a carrier frequency f2 of a carrier component of a transmittable signal S2 comprising carrier frequency f2 and code;
   (c) logic means for enabling frequency f2 to be in mathematical relationship wherein f1 is related to f2 by a function of at least one variable having a value other than zero and one with signal S1, said logic means comprising;
       (i) at least one memory means, adapted to be programmed for storing code,
       (ii) at least one modulation means for modulating said carrier component of signal S2, the modulation being under control of at least a portion of said stored code, such that said frequency F2, will be encoded to provide said mathematical relationship with said frequency f1 and,
       (iii) at least one clock means for providing at least one clocking signal for controlling access of at least a portion of said stored code to said at least one modulation means; and wherein means are provided whereby said at least one memory means is adapted to be programmed with said code by receiving at least one programming signal to be provided by an electromagnetic linkage between said responder and at least one source of said at least one programming signal, said at least one programming signal comprising code to be routed to said at least one memory means so as to provide said stored code.

2. A responder as claimed in claim 1 wherein signals S1, S2 are pulse modulated signals.

3. A responder as claimed in claim 1, wherein said receiver means comprises circuit means for providing frequency f1 higher than the maximum clock rate of said at least one clocking signal of said at least one clock means.

4. A responder as claimed in claim 2 wherein said signals S1, S2 are bandwidth limited pulse modulated signals.

5. A responder as claimed in claim 1, wherein said generator means comprises divider means for enabling frequency f1 and carrier frequency f2 to be characterized by:

$$f1/f2 = n$$

in which n is selected from any whole and fractional number other than zero and one.

6. A responder as claimed in claim 5, wherein said divider means enables frequency f1 and carrier frequency f2 to be characterised by:

$$f1/f2 = n$$

in which n is any whole or fractional number other than zero, n optionally being substantially 2.

7. A responder as claimed in claim 1, wherein said logic means includes means such that at least a portion of said at least one programming signal will be constituted by at least a portion of signal S1.

8. A responder as claimed in claim 8, wherein said logic means has means whereby a change in at least a portion of code comprised by said at least one programming signal will produce change in code in signal S2.

9. A responder as claimed in claim 1, wherein said at least one modulation means is means for providing a pulse modulation of carrier frequency f2.

10. A responder as claimed in claim 2 wherein said logic means comprises gate circuitry adapted to be at least partly controllable by at least one of:
   (i) at least a plurality of signals derived in said responder from signal S1; and
   (ii) at least a portion of a signal S3 receivable by said gate circuitry.

11. A responder as claimed in claim 10, wherein said gate circuitry has 3 inputs, each respectively for a first and second, of the signals derived from signal S1 and for signal S3; and an output for addressing said at least one memory means.

12. A responder as claimed in claim 10, wherein said gate circuitry has means which enable said access to said at least one memory means, such that said second derived signal provides data input to said at least one memory means; and signal S3 will provide clock signals to said at least one memory means so as to control entry of that data into said at least one memory means.

13. A responder as claimed in claim 1, comprising at least one further clock means for providing at least one clocking signal for enabling access of at least a portion of said at lest one programming signal to said at least one memory means.

14. A responder as claimed in claim 10, wherein said at least one further clock means is responsive to an input signal S4 for enabling said clocking signal to be provided by said at least one further clock means.

15. Apparatus, comprising: at least one responder as claimed in claim 1; and transmitter means for transmitting at least one signal S1 to said at least one responder.

16. A responder as claimed in claim 13, wherein said at least one further clock means is adapted for disenabling access of at least a portion of said at least one programming signal to said at least one memory means.

* * * * *